US012052557B2

(12) United States Patent
Jin et al.

(10) Patent No.: US 12,052,557 B2
(45) Date of Patent: Jul. 30, 2024

(54) MULTIFUNCTIONAL SOUNDING DEVICE

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Xin Jin, Shenzhen (CN); Bo Xiao, Shenzhen (CN); Ronglin Linghu, Shenzhen (CN); Fan Zhang, Shenzhen (CN); Wei Song, Shenzhen (CN)

(73) Assignees: AAC MICROTECH (CHANGZHOU) CO., LTD., Changzhou (CN); AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 192 days.

(21) Appl. No.: 17/949,236

(22) Filed: Sep. 21, 2022

(65) Prior Publication Data

US 2023/0328443 A1 Oct. 12, 2023

(30) Foreign Application Priority Data

Apr. 7, 2022 (CN) ........................ 202220794463.X

(51) Int. Cl.
*H04R 1/02* (2006.01)
*H04R 9/02* (2006.01)

(52) U.S. Cl.
CPC ............... *H04R 9/025* (2013.01); *H04R 1/02* (2013.01)

(58) Field of Classification Search
CPC .................................. H04R 9/025; H04R 1/02
See application file for complete search history.

(56) References Cited

U.S. PATENT DOCUMENTS

| | | | | |
|---|---|---|---|---|
| 8,526,660 B2 * | 9/2013 | Guenther | H04R 1/2834 | 381/386 |
| 8,699,745 B2 * | 4/2014 | Saiki | H04R 1/225 | 381/415 |
| 2006/0274914 A1 * | 12/2006 | Horigome | H04R 1/22 | 381/424 |

* cited by examiner

*Primary Examiner* — Suhan Ni
(74) *Attorney, Agent, or Firm* — W&G Law Group

(57) ABSTRACT

Disclosed is a multifunctional sounding device which combines functions of emitting sounds and providing vibrations and includes a speaker unit including a vibration assembly including a first ring and a diaphragm vibrating along a first direction and a magnetic assembly including a main magnet and an auxiliary magnet; an elastic member suspending the speaker unit; a second ring surrounding the first ring; a flexible sealing membrane connected between the two rings; and a driving coil driving the speaker unit for vibrating in a second direction. The two directions are perpendicular. The driving coil includes two sides respectively facing the main magnet and the auxiliary magnet in the first direction. The diaphragm, the first ring, the flexible sealing membrane and the second ring are integrally formed, thereby ensuring concentricity of them four and avoiding glue width requirements so as to release spaces.

8 Claims, 5 Drawing Sheets

MULTIFUNCTIONAL SOUNDING DEVICE

FIELD OF THE PRESENT DISCLOSURE

The present disclosure relates to electronic devices, in particular to a multifunctional sounding device.

DESCRIPTION OF THE RELATED ART

With developments of electronic technologies, portable electronic devices are becoming more and more popular, such as smart phones, handheld game players, palmtops and so on. These electronic devices interact with users through emitting sounds and/or providing vibrations.

An electronic device in the related art has an individual speaker for emitting sounds and an individual vibrator for providing vibrations. Separate installations of the speaker and the vibrator cause a cumbersome manufacturing process. While, the speaker and the vibrator occupy a great many of interior spaces of the electronic device.

Thus, it is necessary to provide a novel multifunctional sounding device to solve the problem.

SUMMARY

An objective of the present disclosure is to provide a multifunctional sounding device which combines functions of emitting sounds and providing vibrations.

In order to achieve the objective mentioned above, the present disclosure discloses a multifunctional sounding device including a housing; a speaker unit accommodated in the housing including a vibration assembly and a magnetic assembly, the vibration assembly including a first ring and a diaphragm fixed to an inner side of the first ring and configured to vibrate along a first direction for emitting sounds, the magnetic assembly including a main magnet and an auxiliary magnet spaced apart from the main magnet for forming a magnetic gap; an elastic member fixed to the housing and configured to suspend the speaker unit in the housing; a second ring fixed to the housing and surrounding the first ring; a flexible sealing membrane connected between the first ring and the second ring; and a driving coil fixed to the housing and configured to drive the speaker unit for vibrating in a second direction and providing vibrations, the driving coil including a first side which is opposite to and spaced apart from the main magnet in the first direction and a second side which is opposite to the first side in the second direction and is opposite to and spaced apart from the auxiliary magnet in the first direction. Wherein the second direction is perpendicular to the first direction; the diaphragm, the first ring, the flexible sealing membrane and the second ring are integrally formed.

Further, the speaker unit includes a shell for accommodating the vibration assembly and the magnetic assembly, the shell includes a first fixing wall extending along a long-axis direction of the speaker unit and a second fixing wall extending along a short-axis direction of the speaker unit, the first fixing wall is fixed to an outer side of the first ring, the second fixing wall is fixed to the inner side of the first ring.

Further, the magnetic assembly includes a bottom plate for connecting the main magnet and the auxiliary magnet, a main pole plate attached to the main magnet, and an annular auxiliary pole plate attached to the auxiliary magnet, the annular auxiliary pole plate is provided with an extension wall extending toward the first fixing wall, the first fixing wall is provided with a first flange bent and extending toward the magnetic assembly, the first flange is overlapped against the extension wall.

Further, the vibration assembly includes an elastic supporting member opposite to and spaced apart from the diaphragm, a skeleton connected between the diaphragm and the elastic supporting member, and a voice coil fixed to the skeleton, the voice coil locates in the magnetic gap, the first fixing wall is further provided with a second flange bent and extending toward the vibration assembly, the elastic supporting member is overlapped against the second flange.

Further, the shell is provided with a first recessed portion recessed in the first direction and a second recessed portion recessed in the second direction, at least part of the driving coil is accommodated in the first recessed portion, at least part of the elastic member is accommodated in the second recessed portion.

Further, a polarity of an end of the main magnet facing the driving coil and a polarity of an end of the auxiliary magnet facing the driving coil are opposite.

Further, in the first direction, a winding hole of the driving coil between the first side and the second side is directly opposite to the magnetic gap.

Further, the speaker unit includes a mesh attached to sides of the main magnet and the auxiliary magnet facing the driving coil, the mesh covers the magnetic gap.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure.

DETAILED DESCRIPTION OF THE EMBODIMENTS

The present disclosure will hereinafter be described in detail with reference to the embodiments. To make the technical problems to be solved, and technical solutions and beneficial effects of the present disclosure more apparent, the present disclosure is described in further detail together with the figures and the embodiments. It should be understood the embodiments described hereby are only to explain the disclosure, not intended to limit the disclosure.

Figure 1:
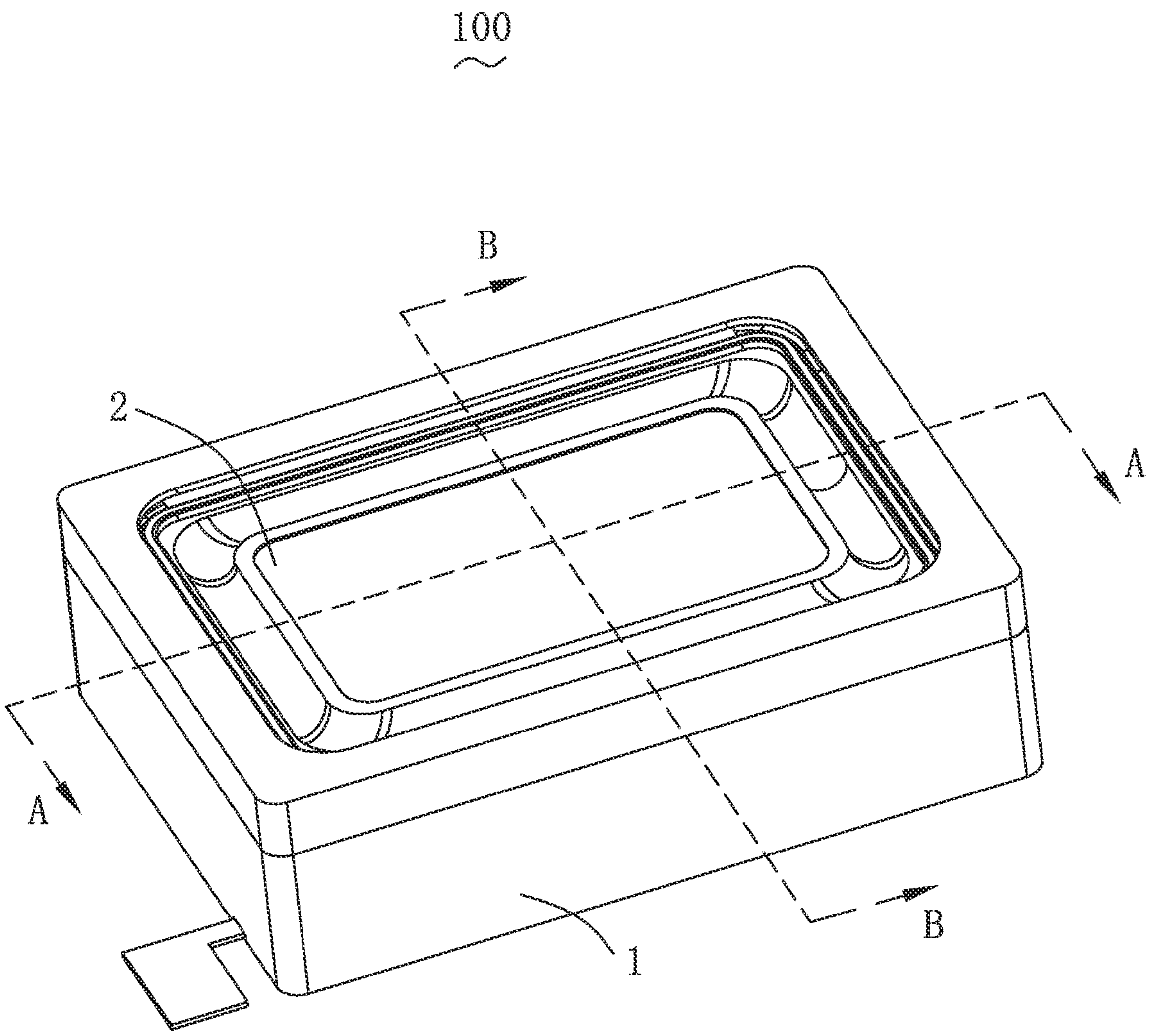
FIG. 1 is an isometric view of a multifunctional sounding device in accordance with an exemplary embodiment of the present disclosure.
Figure 2:
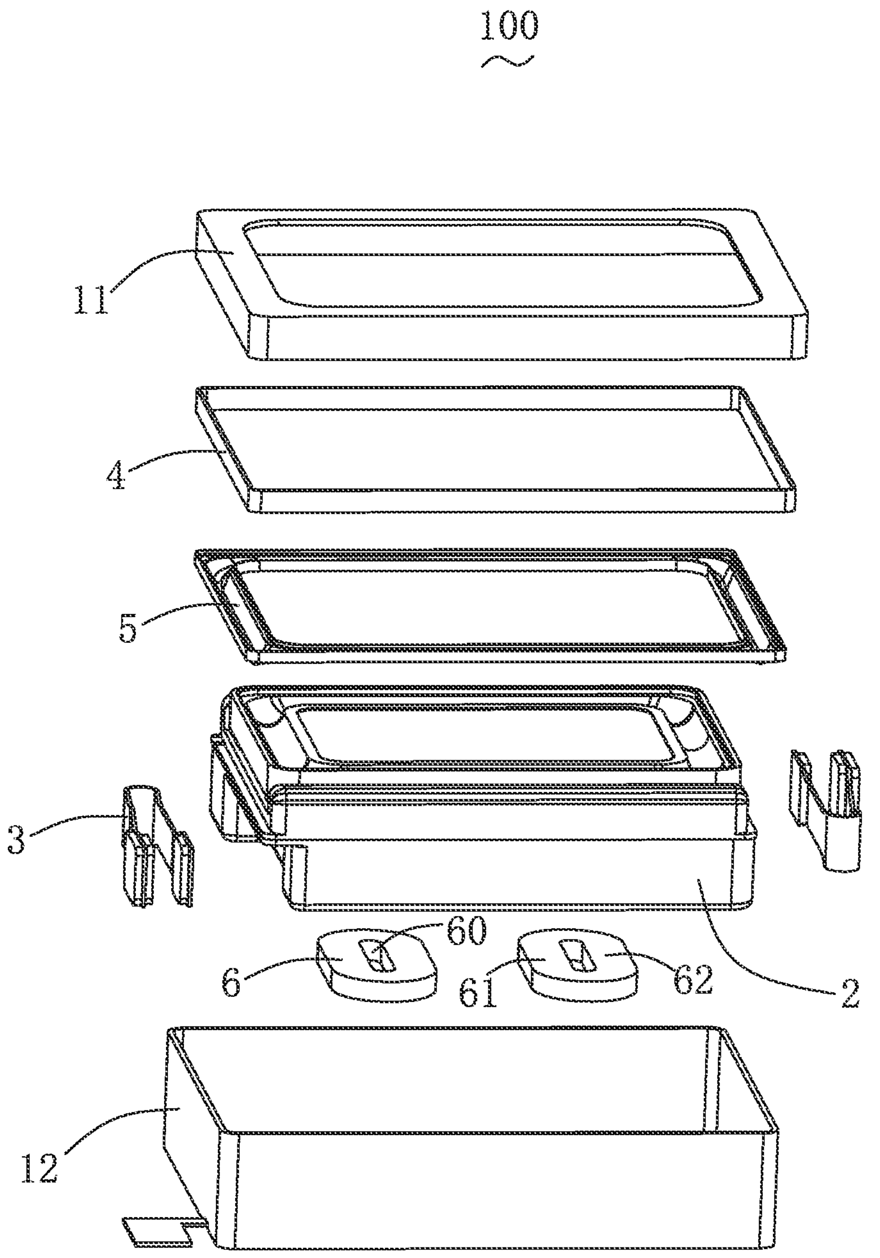
FIG. 2 is a partially exploded view of the multifunctional sounding device in FIG. 1.
Figure 3:
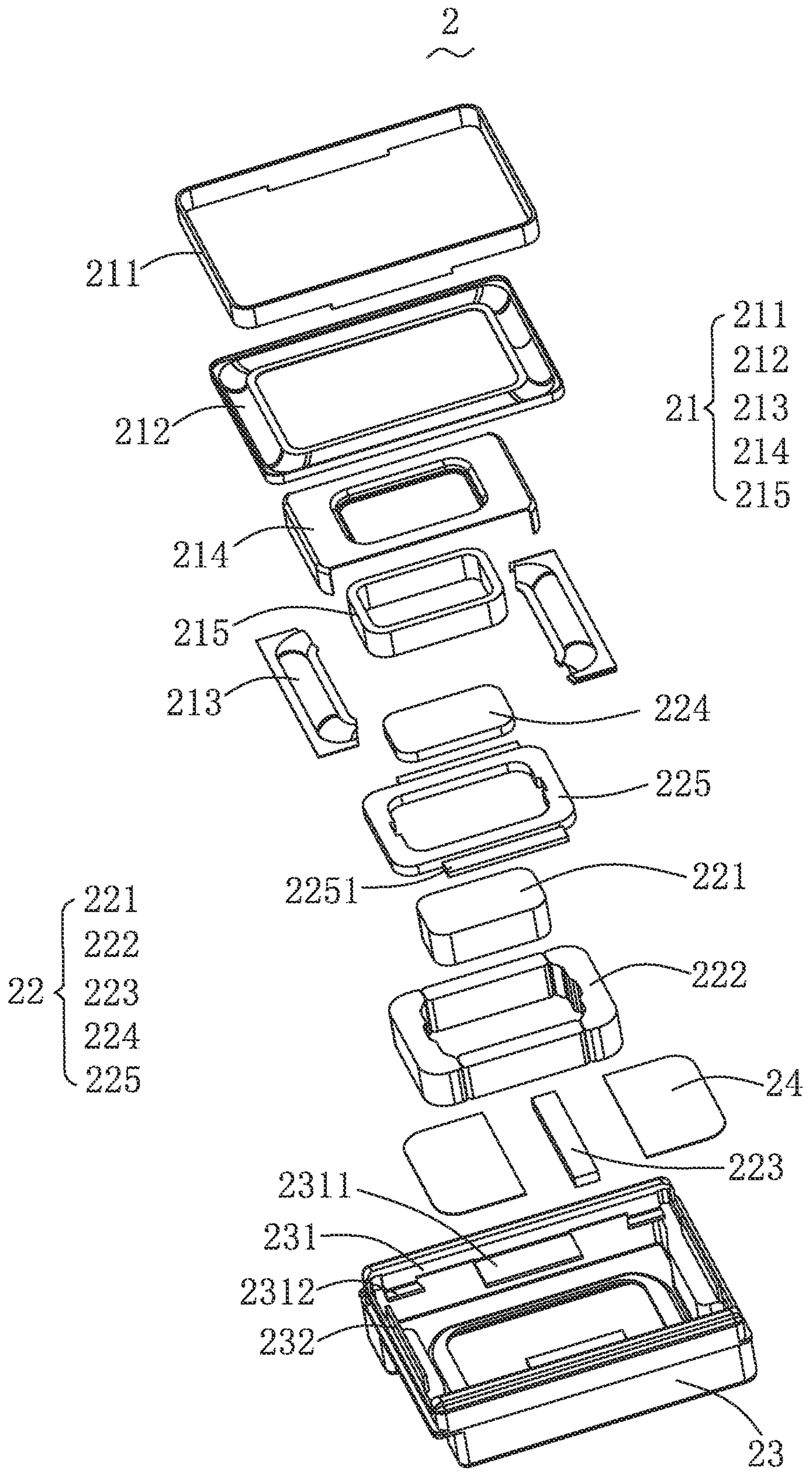
FIG. 3 is an exploded view of a speaker unit of the multifunctional sounding device in FIG. 1.
Figure 4:
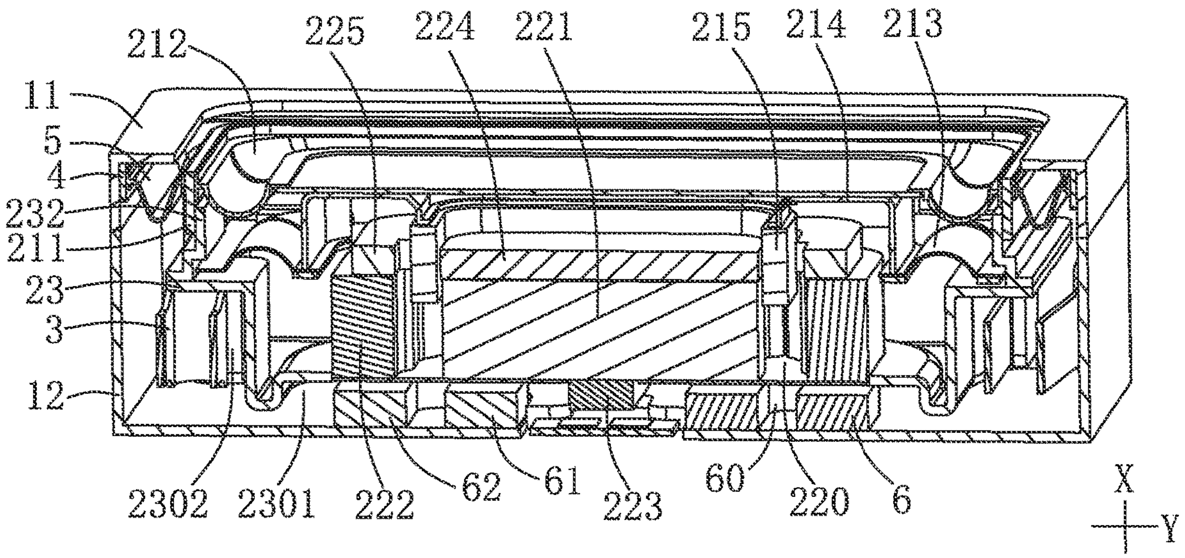
FIG. 4 is a cross-sectional view of the multifunctional sounding device, taken along line A-A in FIG. 1.
Figure 5:
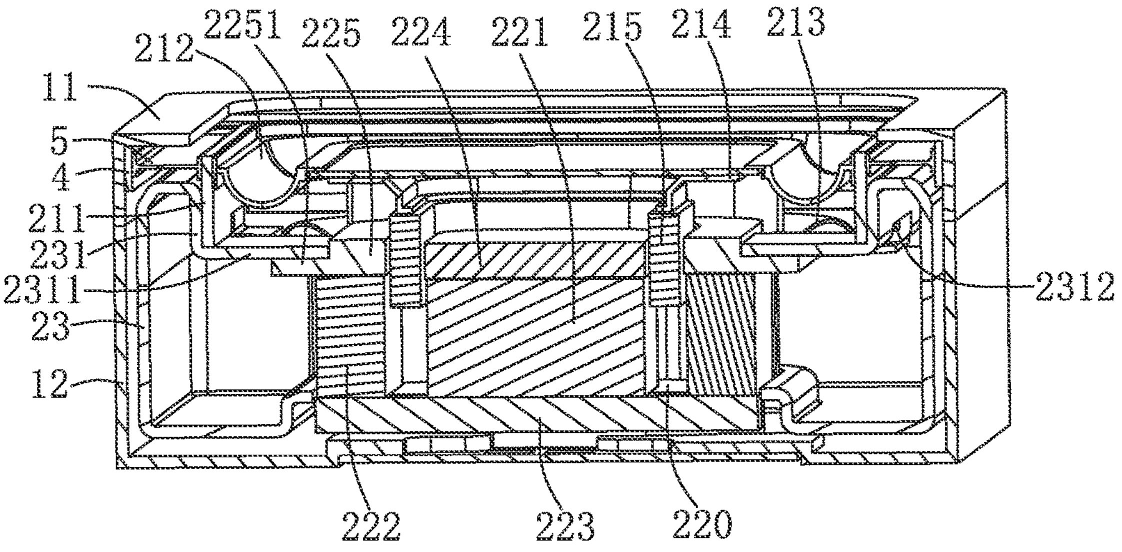
FIG. 5 is a cross-sectional view of the multifunctional sounding device, taken along line B-B in FIG. 1.
Figure 6:
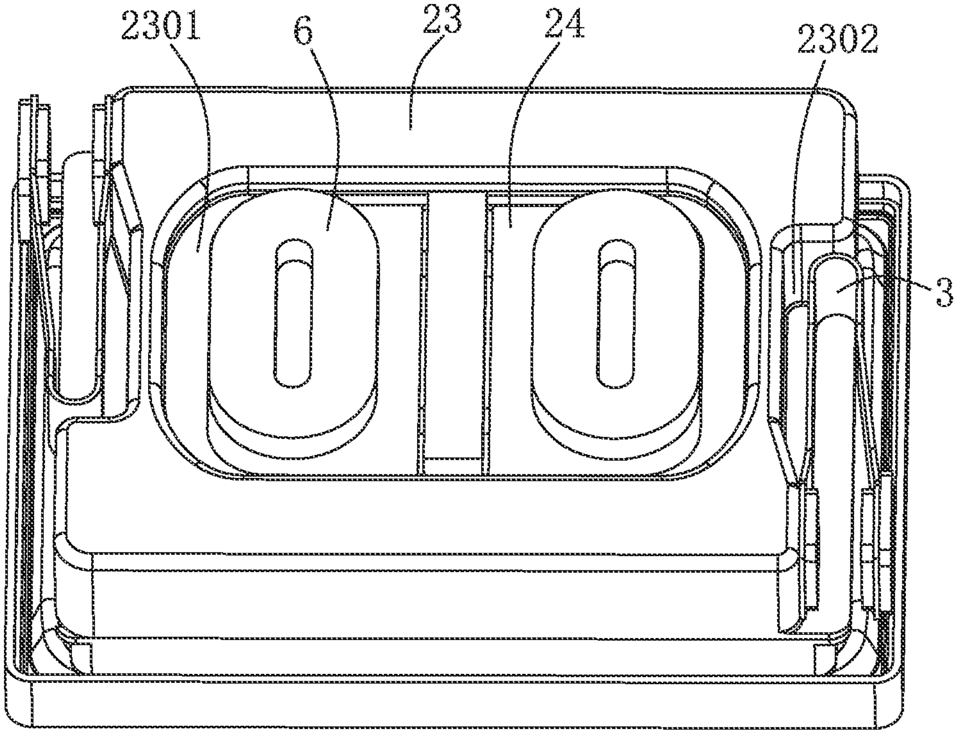
FIG. 6 is an isometric view of the multifunctional sounding device in FIG. 1, removing part of a housing.

Referring to FIGS. 1-6, the present disclosure discloses a multifunctional sounding device 100 including a housing 1 and a speaker unit 2 accommodated in the housing 1. Optionally, the housing 1 includes an upper part 11 and a lower part 12 engaged with the upper part 11.

The speaker unit 2 includes a vibration assembly 21, a magnetic assembly 22 and a shell 23 for accommodating the vibration assembly 21 and the magnetic assembly 22.

The vibration assembly 21 includes a first ring 211, a diaphragm 212 fixed to an inner side of the first ring 211 and configured to vibrate along a first direction X for emitting sounds, an elastic supporting member 213 opposite to and spaced apart from the diaphragm 212, a skeleton 214 connected between the diaphragm 212 and the elastic supporting member 213, and a voice coil 215 fixed to the skeleton 214.

The magnetic assembly 22 includes a main magnet 221, an auxiliary magnet 222 spaced apart from the main magnet 221 for forming a magnetic gap 220, a bottom plate 223 for connecting the main magnet 221 and the auxiliary magnet 222, a main pole plate 224 attached to the main magnet 221, and an annular auxiliary pole plate 225 attached to the auxiliary magnet 222. The voice coil 215 locates in the magnetic gap 220.

The shell 23 includes a first fixing wall 231 extending along a long-axis direction of the speaker unit 2 and a second fixing wall 232 extending along a short-axis direction of the speaker unit 2, the first fixing wall 231 is fixed to an outer side of the first ring 211, the second fixing wall 232 is fixed to the inner side of the first ring 211.

The annular auxiliary pole plate 225 is provided with an extension wall 2251 extending toward the first fixing wall 231, the first fixing wall 231 is provided with a first flange 2311 bent and extending toward the magnetic assembly 22, the first flange 2311 is overlapped against the extension wall 2251.

The first fixing wall 231 is further provided with a second flange 2312 bent and extending toward the vibration assembly 21, the elastic supporting member 213 is overlapped against the second flange 2312.

The multifunctional sounding device 100 further includes an elastic member 3 fixed to the lower part 12 of the housing 1 and configured to suspend the speaker unit 2 in the housing 1, a second ring 4 fixed to the upper part 11 of the housing 1 and surrounding the first ring 211, a flexible sealing membrane 5 connected between the first ring 211 and the second ring 4, and a driving coil 6 fixed to the lower part 12 of the housing 1 and configured to drive the speaker unit 2 for vibrating in a second direction Y and providing vibrations. The second direction Y is perpendicular to the first direction X. The diaphragm 212, the first ring 211, the flexible sealing membrane 5 and the second ring 4 are integrally formed. The integrally formed way includes but is not limited to hot pressing and injection molding. The diaphragm 212 and the flexible sealing membrane 5 can be made of different materials according to different design requirements. The first ring 211 separates the diaphragm 212 and the flexible sealing membrane 5 and keeps the diaphragm 212 and the flexible sealing membrane 5 on both sides of the first ring 211 independent.

The driving coil 6 includes a first side 61 which is opposite to and spaced apart from the main magnet 221 in the first direction X, and a second side 62 which is opposite to the first side 61 in the second direction Y and is opposite to and spaced apart from the auxiliary magnet 222 in the first direction X. A polarity of an end of the main magnet 221 facing the driving coil 6 and a polarity of an end of the auxiliary magnet 222 facing the driving coil 6 are opposite. Optionally, in the first direction X, a winding hole 60 of the driving coil 6 between the first side 61 and the second side 62 is directly opposite to the magnetic gap 220.

The shell 23 is provided with a first recessed portion 2301 recessed in the first direction X and a second recessed portion 2302 recessed in the second direction Y, at least part of the driving coil 6 is accommodated in the first recessed portion 2301, at least part of the elastic member 3 is accommodated in the second recessed portion 2302. The first recessed portion 2301 and the second recessed portion 2302 can make the overall structure compact and save spaces.

The speaker unit 2 further includes a mesh 24 attached to sides of the main magnet 221 and the auxiliary magnet 222 facing the driving coil 6, the mesh 24 covers the magnetic gap 220.

The multifunctional sounding device 100 combines functions of emitting sounds and providing vibrations. The diaphragm 212, the first ring 211, the flexible sealing membrane 5 and the second ring 4 are integrally formed, thereby ensuring concentricity of them four and avoiding glue width requirements so as to release spaces.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A multifunctional sounding device, comprising:
a housing;
a speaker unit accommodated in the housing, comprising:
a vibration assembly, comprising:
a first ring; and
a diaphragm fixed to an inner side of the first ring and configured to vibrate along a first direction for emitting sounds; and
a magnetic assembly, comprising:
a main magnet; and
an auxiliary magnet spaced apart from the main magnet for forming a magnetic gap;
an elastic member fixed to the housing and configured to suspend the speaker unit in the housing;
a second ring fixed to the housing and surrounding the first ring;
a flexible sealing membrane connected between the first ring and the second ring; and
a driving coil fixed to the housing and configured to drive the speaker unit for vibrating in a second direction and providing vibrations, comprising:
a first side, which is opposite to and spaced apart from the main magnet in the first direction; and
a second side, which is opposite to the first side in the second direction and is opposite to and spaced apart from the auxiliary magnet in the first direction;
wherein the second direction is perpendicular to the first direction; the diaphragm, the first ring, the flexible sealing membrane and the second ring are integrally formed.

2. The multifunctional sounding device as described in claim 1, wherein the speaker unit further comprises a shell for accommodating the vibration assembly and the magnetic assembly, the shell comprises a first fixing wall extending along a long-axis direction of the speaker unit and a second fixing wall extending along a short-axis direction of the speaker unit, the first fixing wall is fixed to an outer side of the first ring, the second fixing wall is fixed to the inner side of the first ring.

3. The multifunctional sounding device as described in claim 2, wherein the magnetic assembly further comprises a bottom plate for connecting the main magnet and the auxiliary magnet, a main pole plate attached to the main magnet, and an annular auxiliary pole plate attached to the auxiliary magnet, the annular auxiliary pole plate is provided with an extension wall extending toward the first fixing wall, the first fixing wall is provided with a first flange bent and extending toward the magnetic assembly, the first flange is overlapped against the extension wall.

4. The multifunctional sounding device as described in claim 3, wherein the vibration assembly further comprises an elastic supporting member opposite to and spaced apart from the diaphragm, a skeleton connected between the diaphragm and the elastic supporting member, and a voice coil fixed to the skeleton, the voice coil locates in the magnetic gap, the first fixing wall is further provided with a second flange bent and extending toward the vibration assembly, the elastic supporting member is overlapped against the second flange.

5. The multifunctional sounding device as described in claim 3, wherein the speaker unit further comprises a mesh attached to sides of the main magnet and the auxiliary magnet facing the driving coil, the mesh covers the magnetic gap.

6. The multifunctional sounding device as described in claim 2, wherein the shell is provided with a first recessed portion recessed in the first direction and a second recessed portion recessed in the second direction, at least part of the driving coil is accommodated in the first recessed portion, at least part of the elastic member is accommodated in the second recessed portion.

7. The multifunctional sounding device as described in claim 1, wherein a polarity of an end of the main magnet facing the driving coil and a polarity of an end of the auxiliary magnet facing the driving coil are opposite.

8. The multifunctional sounding device as described in claim 1, wherein in the first direction, a winding hole of the driving coil between the first side and the second side is directly opposite to the magnetic gap.

* * * * *